United States Patent
Williams et al.

(10) Patent No.: US 8,254,262 B1
(45) Date of Patent: Aug. 28, 2012

(54) PASSIVE RECORDING AND LOAD BALANCING

(75) Inventors: Jamie R. Williams, Alpharetta, GA (US); Thomas Z. Dong, Marietta, GA (US)

(73) Assignee: Verint Americas, Inc., Roswell, GA (US)

( * ) Notice: Subject to any disclaimer, the term of this patent is extended or adjusted under 35 U.S.C. 154(b) by 924 days.

(21) Appl. No.: 11/395,497

(22) Filed: Mar. 31, 2006

(51) Int. Cl.
*H04L 12/26* (2006.01)
*G06F 15/173* (2006.01)

(52) U.S. Cl. .................. 370/238; 709/238; 709/241

(58) Field of Classification Search .................. None
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner* — Clemence Han
(74) *Attorney, Agent, or Firm* — McKeon, Meunier, Carlin & Curfman (57) ABSTRACT

Included are embodiments of a method for routing communication data to a plurality of recorders. At least one embodiment of a method includes passively receiving communication data related to a communication and determining to which recorder the received communication data is to be routed in order to achieve a substantially balanced utilization of the plurality recorders. Other embodiments include routing the communication data to the determined recorder.

16 Claims, 7 Drawing Sheets

U.S. PATENT DOCUMENTS

| | | | |
|---|---|---|---|
| 5,572,652 | A | 11/1996 | Robusto et al. |
| 5,577,112 | A | 11/1996 | Cambray et al. |
| 5,590,171 | A | 12/1996 | Howe et al. |
| 5,597,312 | A | 1/1997 | Bloom et al. |
| 5,619,183 | A | 4/1997 | Ziegra et al. |
| 5,696,906 | A | 12/1997 | Peters et al. |
| 5,717,879 | A | 2/1998 | Moran et al. |
| 5,721,842 | A | 2/1998 | Beasley et al. |
| 5,742,670 | A | 4/1998 | Bennett |
| 5,748,499 | A | 5/1998 | Trueblood |
| 5,778,182 | A | 7/1998 | Cathey et al. |
| 5,784,452 | A | 7/1998 | Carney |
| 5,790,798 | A | 8/1998 | Beckett, II et al. |
| 5,796,952 | A | 8/1998 | Davis et al. |
| 5,809,247 | A | 9/1998 | Richardson et al. |
| 5,809,250 | A | 9/1998 | Kisor |
| 5,825,869 | A | 10/1998 | Brooks et al. |
| 5,835,572 | A | 11/1998 | Richardson, Jr. et al. |
| 5,862,330 | A | 1/1999 | Anupam et al. |
| 5,864,772 | A | 1/1999 | Alvarado et al. |
| 5,884,032 | A | 3/1999 | Bateman et al. |
| 5,907,680 | A | 5/1999 | Nielsen |
| 5,918,214 | A | 6/1999 | Perkowski |
| 5,923,746 | A | 7/1999 | Baker et al. |
| 5,933,811 | A | 8/1999 | Angles et al. |
| 5,944,791 | A | 8/1999 | Scherpbier |
| 5,948,061 | A | 9/1999 | Merriman et al. |
| 5,958,016 | A | 9/1999 | Chang et al. |
| 5,964,836 | A | 10/1999 | Rowe et al. |
| 5,978,648 | A | 11/1999 | George et al. |
| 5,982,857 | A | 11/1999 | Brady |
| 5,987,466 | A | 11/1999 | Greer et al. |
| 5,990,852 | A | 11/1999 | Szamrej |
| 5,991,373 | A | 11/1999 | Pattison et al. |
| 5,991,796 | A | 11/1999 | Anupam et al. |
| 6,005,932 | A | 12/1999 | Bloom |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,058,163 | A | 5/2000 | Pattison et al. |
| 6,061,798 | A | 5/2000 | Coley et al. |
| 6,072,860 | A | 6/2000 | Kek et al. |
| 6,076,099 | A | 6/2000 | Chen et al. |
| 6,078,894 | A | 6/2000 | Clawson et al. |
| 6,091,712 | A | 7/2000 | Pope et al. |
| 6,108,711 | A | 8/2000 | Beck et al. |
| 6,122,665 | A | 9/2000 | Bar et al. |
| 6,122,668 | A | 9/2000 | Teng et al. |
| 6,130,668 | A | 10/2000 | Stein |
| 6,138,139 | A | 10/2000 | Beck et al. |
| 6,144,991 | A | 11/2000 | England |
| 6,146,148 | A | 11/2000 | Stuppy |
| 6,151,622 | A | 11/2000 | Fraenkel et al. |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,282,548 | B1 | 8/2001 | Burner et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIlwaine et al. |
| 6,347,374 | B1 | 2/2002 | Drake et al. |
| 6,351,467 | B1 | 2/2002 | Dillon |
| 6,353,851 | B1 | 3/2002 | Anupam et al. |
| 6,360,250 | B1 | 3/2002 | Anupam et al. |
| 6,370,547 | B1 | 4/2002 | House et al. |
| 6,388,584 | B1 * | 5/2002 | Dorward et al. ............ 341/51 |
| 6,404,857 | B1 | 6/2002 | Blair et al. |
| 6,411,989 | B1 | 6/2002 | Anupam et al. |
| 6,418,471 | B1 | 7/2002 | Shelton et al. |
| 6,459,787 | B2 | 10/2002 | McIlwaine et al. |
| 6,487,195 | B1 | 11/2002 | Choung et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,535,909 | B1 | 3/2003 | Rust |
| 6,542,602 | B1 | 4/2003 | Elazer |
| 6,546,405 | B2 | 4/2003 | Gupta et al. |
| 6,560,328 | B1 | 5/2003 | Bondarenko et al. |
| 6,583,806 | B2 | 6/2003 | Ludwig et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,904,017 | B1 * | 6/2005 | Meempat et al. ............ 370/238 |
| 6,959,078 | B1 | 10/2005 | Eilbacher et al. |
| 6,965,886 | B2 | 11/2005 | Govrin et al. |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0059451 | A1 * | 5/2002 | Haviv ............ 709/238 |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0156887 | A1 * | 10/2002 | Hashimoto ............ 709/224 |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2003/0210663 | A1 * | 11/2003 | Everson et al. ............ 370/329 |
| 2004/0088412 | A1 * | 5/2004 | John et al. ............ 709/226 |
| 2004/0100507 | A1 | 5/2004 | Hayner et al. |
| 2004/0120501 | A1 * | 6/2004 | Celi et al. ............ 379/265.01 |
| 2004/0165717 | A1 | 8/2004 | McIlwaine et al. |
| 2004/0247205 | A1 * | 12/2004 | Nagaya et al. ............ 382/305 |
| 2004/0260873 | A1 * | 12/2004 | Watanabe ............ 711/114 |
| 2005/0138560 | A1 | 6/2005 | Lee et al. |
| 2005/0278453 | A1 * | 12/2005 | Cherkasova ............ 709/231 |
| 2005/0283818 | A1 * | 12/2005 | Zimmermann et al. ...... 725/134 |
| 2006/0112247 | A1 * | 5/2006 | Ramany et al. ............ 711/165 |
| 2006/0203807 | A1 * | 9/2006 | Kouretas et al. ............ 370/352 |
| 2007/0083727 | A1 * | 4/2007 | Johnston et al. ............ 711/170 |
| 2008/0240686 | A1 * | 10/2008 | Nagaya et al. ............ 386/124 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," A *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of End-User Training Needs," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," Computer Education 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *Info World* 20(47):6467 (Nov. 23, 1998).
Unknown Author, "Long-distance learning," *Info World* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu —*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza While Yyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

\* cited by examiner

PASSIVE RECORDING AND LOAD BALANCING

BACKGROUND

In an Internet Protocol (IP) communications network, any of a plurality of communications devices may be configured to send data to and receive data from other communications devices. Users of the communications devices, network administrators, and/or third parties may desire to record the data communicated to and/or from a particular communications device. Currently, networks are configured to provide a recorder to passively record communications sent to and from a particular communications device. While such a solution may accommodate recording needs for a small number of communications devices, a single recorder can become overloaded when recording is desired for numerous communications devices.

Some networks utilize multiple recorders, where each recorder is dedicated to a subset of the communications devices. While this solution can alleviate some of the problems of recorder overload, this solution, however, typically results in certain recorders being overused, while others become under-utilized.

Thus, a heretofore unaddressed need exists in the industry to address the aforementioned deficiencies and inadequacies.

SUMMARY

Included are embodiments of a method for routing communication data to a plurality of recorders. At least one embodiment of a method includes passively receiving communication data related to a communication and determining to which recorder the received communication data is to be routed in order to achieve a substantially balanced utilization of the plurality recorders. Other embodiments include routing the communication data to the determined recorder.

Also included are embodiments of a load balancer that is passively coupled to a communications network, the load balancer configured for routing communication data to a plurality of recorders. At least one embodiment of a load balancer includes logic configured to passively receive communication data related to a communication and logic configured to determine to which recorder the received communication data is to be routed in order to achieve a substantially balanced utilization of the plurality recorders. Other embodiments include logic configured to route the communication data to the determined recorder.

Additionally included are embodiments of a system for routing communication data to a plurality of recorders. At least one embodiment of a system includes a plurality of recorders, at least one of the plurality of recorders being configured to receive data related to the communication and a load balancer coupled to the plurality of recorders.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included in this description are systems and methods for passively recording and load balancing received data in an Internet Protocol IP environment. More specifically, in at least one embodiment a load balancing component can be coupled to a plurality of recorders for distributing received data to the recorders in a substantially balanced manner. By including a load balancing component in such a manner, mirrored communication (and control) data can be received in a passive manner and recorded by one (or more) of the plurality of recorders in a manner to more effectively utilize the capabilities of the recorders. Discussed below are embodiments for implementing the this functionality, as well as others.

Figure 1A:
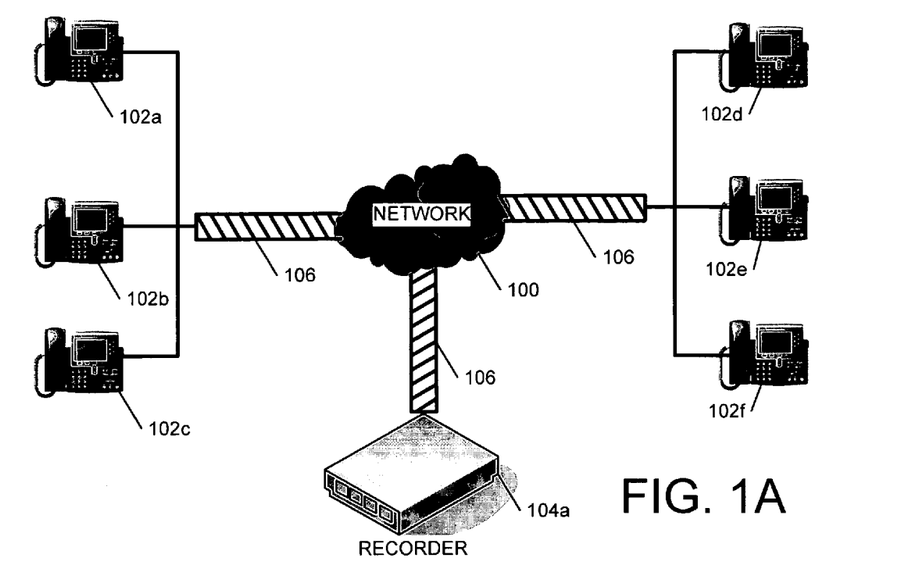
FIG. 1A is an exemplary network diagram illustrating a recorder passively coupled to a communications network.

FIG. 1A is an exemplary network diagram illustrating a recorder passively coupled to a communications network. As illustrated in the nonlimiting example of FIG. 1A, network 100, which can include a wide area network (WAN), the Internet or other network, is coupled to communications devices 102a-102f. Also coupled to network 100 is a recorder 104a. As illustrated, the recorder 104a is coupled in a passive implementation to communications devices 102. A passive implementation can include receiving mirrored data from a communication, similar to a passive tap implementation.

As a nonlimiting example, system designers can analyze network traffic through ports or Virtual Local Area Networks (VLANs) by using a System Port Analyzer (SPAN) to send a copy of the communication traffic (mirrored data) to another port on the switch that has been connected to a Remote Monitoring (RMON) probe. In operation, a copy of the data communicated between communications devices 102 may be directed to recorder 104a. Recorder 104a, however, is not a party to the communication and the communications devices 102 do not generally have information related to the presence and operation of recorder 104a.

Also included in the nonlimiting example of FIG. 1A is a network pipeline 106. Network pipeline 106 is included to illustrate that while the configuration of FIG. 1A may provide recording services to a small number of communications devices, as the amount of information to be recorded increases, the network pipeline 106 may be capable of communicating more information than a single recorder can process. As such, the recorder 104a may malfunction, burnout, or otherwise fail to provide the desired recording services.

One should note that while communications devices 102a, 102b, and 102c are directly coupled together and communications devices 102d, 102e, and 102f are coupled directly together, this is a nonlimiting example. As one of ordinary skill in the art will understand, any configuration for providing communications services between communications devices may be implemented. Such a configuration may also be represented with a plurality of communications devices independently coupled to the network 100, however, this too is a nonlimiting example.

Figure 1B:
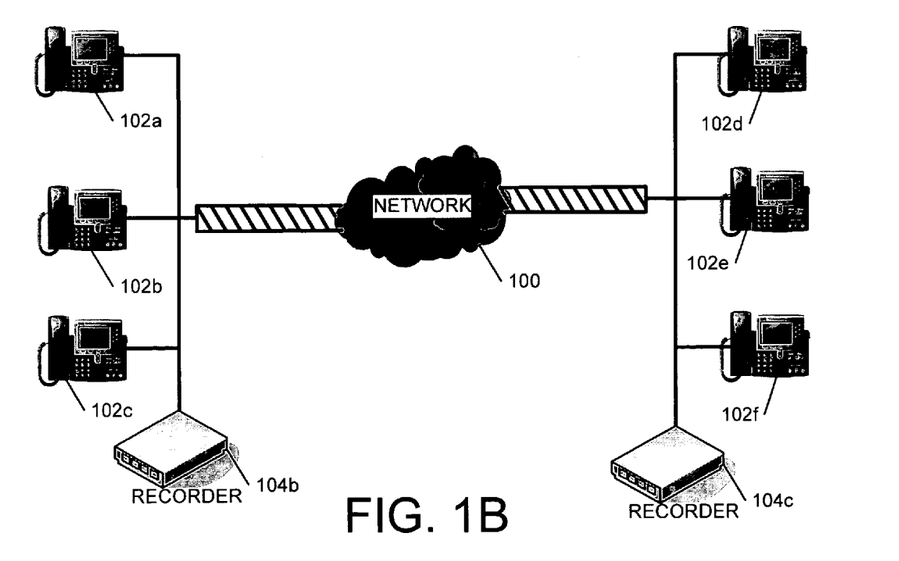
FIG. 1B is an exemplary network diagram illustrating a plurality of recorders passively coupled to a subset of communications devices in the communications network from FIG. 1A.

FIG. 1B is an exemplary network diagram illustrating a plurality of recorders passively coupled to a subset of the communications devices from the communications network from FIG. 1A. As illustrated in the nonlimiting example of FIG. 1B, one solution for recording in a network with a large number of communications devices is to passively tap recorders to a subset of the communications devices 102 in the network 100. More specifically, as illustrated in FIG. 1B, communications devices 102 are coupled to network 100. Additionally, recorder 104b is coupled to communications devices 102a, 102b, and 102c. Similarly, recorder 104c is coupled to communications devices 102d, 102e, and 102f.

While the configuration from FIG. 1B illustrates the ability to provide recording services to all communications devices 102 in FIG. 1B, this configuration can result in problems when recording demands are not evenly distributed. As a nonlimiting example, if communications devices 102a, 102b, and 102c are responsible for 80% of all recordings, then recorder 104b is recording 80% of the network traffic. As such, recorder 104b may reach its storage limit and/or be subject to malfunction due to the large number of recordings. Similarly, recorder 104c will be responsible for only 20% of the recordings (in this nonlimiting example) and may be under-utilized for its capabilities.

Figure 2:
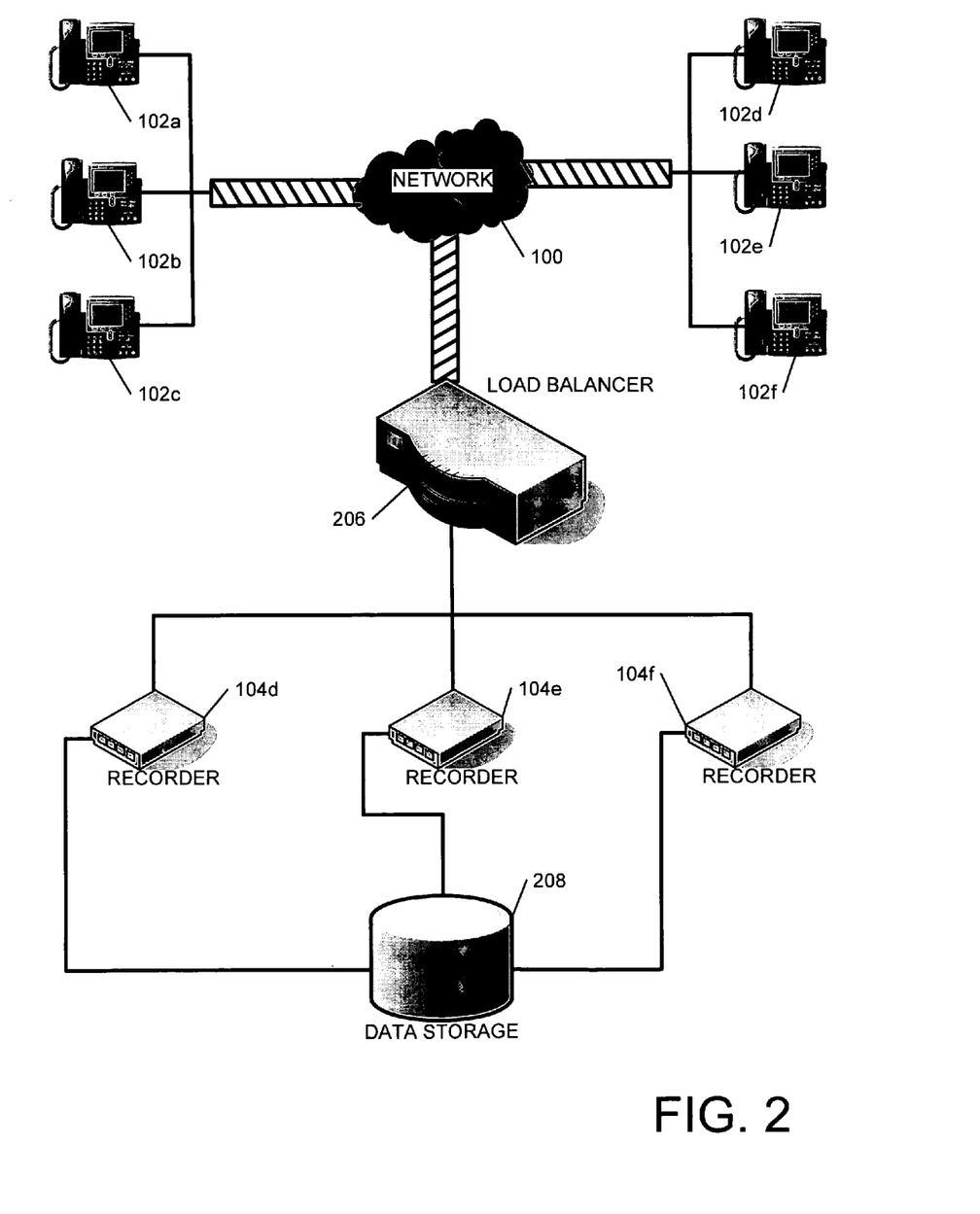
FIG. 2 is an exemplary network diagram illustrating an embodiment of a load balancer coupled to a plurality of recorders for the network from FIG. 1A.

FIG. 2 is an exemplary network diagram illustrating a load balancer coupled to a plurality of recorders for the network from FIG. 1A. More specifically, the nonlimiting example of FIG. 2 illustrates communications devices 102 coupled to network 100. Similar to the configuration from FIG. 1A, the recording traffic (at least a portion of the time) can be generally too large for any one recorder. Additionally, a network administrator may desire to control bandwidth usage by routing recording traffic to a particular recorder(s). As such, a plurality of recorders 104d, 104e, and 104f may be coupled to the network 100 via a load balancer 206. Similar to the configuration from FIG. 1A, the recorders 104d, 104e, and 104f are configured for passive recording of mirrored traffic. Also coupled to the load balancer is a data storage unit 208.

As a nonlimiting example, in operation, a user on communications device 102a can initiate a communication with a user on communications device 102d. One of the users, a system administrator, and/or a third party may desire that the communication be recorded. To facilitate the recording, data is communicated to the load balancer 206 during the communication. The load balancer 206 can be configured to receive the data for recording and route the received data to one or more of the recorders 104d, 104e, and 104f. As data from different communications (and/or different streams of the same communication) is received, the load balancer 206 can determine to which recorder that data is routed. This determination can be made based on a balancing algorithm, such as a round robin algorithm, weighted round robin algorithm, a source-destination algorithm, or other algorithm, as discussed below.

Using a round robin algorithm with three recorders as illustrated in FIG. 2, the following call distribution can be achieved.

TABLE 1

Round Robin

| Calls Active | Recorder 104d | Recorder 104e | Recorder 104f |
|---|---|---|---|
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1, Call4 | 0 | Call3 |
| Call3, Call4, Call5 | Call4 | Call5 | Call3 |
| Call3, Call4 | Call4 | 0 | Call3 |
| Call3 | 0 | 0 | Call3 |

As illustrated, as communications are received at the load balancer, the round robin algorithm can automatically route calls to a recorder in a manner that provides a substantially balanced workload to each recorder. More specifically, the round robin algorithm can be configured to allocate calls based on past recorder utilization. In other words, the round robin algorithm can be configured to route the most recently received call to recorders in a continuously repeating sequence. While the round robin algorithm may be desirable in certain configurations, a weighted round robin algorithm may be used to route recording traffic in other configurations.

TABLE 2

Weighted Round Robin

| Calls Active | Recorder 104d | Recorder 104e | Recorder 104f |
|---|---|---|---|
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1 | Call4 | Call3 |
| Call3, Call4, Call5 | Call5 | Call4 | Call3 |
| Call3, Call4 | 0 | Call4 | Call3 |
| Call3 | 0 | 0 | Call3 |

The call distribution in Table 2 shows that the weighted round robin algorithm considers the load on each of the recorders before routing the communication data (e.g., real time packet (RTP)) flow to the recorders. In other words, the algorithm can be configured to determine the recorder(s) that are currently utilized less than other recorders. This can result in providing a substantially balanced distribution of calls across the recorders, in that the least utilized recorder receives the call. If there are two (or more) recorders with equal current utilization, the weighted round robin algorithm can route the newly received call to the recorder next in the sequence (similar to the round robin algorithm discussed above). This means that, depending on the particular configuration, hard-disk space for storing recording data (e.g., at data storage 208) can be utilized in a roughly even manner.

TABLE 3

| Calls Active | Source-Destination | | |
|---|---|---|---|
| | Recorder 104d | Recorder 104e | Recorder 104f |
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1 | 0 | Call3 |
| Call3, Call4, Call5 | Call5 (assuming call1 finishes before call5 starts and is made between the same extension and gateway as call 1) | Call4 | Call3 |
| Call3, Call4, Call5, Call6, Call7 | Call5, Call6, Call7 | Call4 | Call3 |
| Call3, Call4 | 0 | Call4 | Call3 |
| Call3 | 0 | 0 | Call3 |

While the above described round robin algorithm and weighted round robin algorithm can be utilized for many recording environments, when call data is received at the load balancer in different data streams (i.e., the communication data sent from a communications device is received in a different data stream than the communication data received at the communications device), a source-destination algorithm may be used. More specifically, if the endpoint of a VoIP call (e.g., communications device 102) receives and sends the communications data (e.g., RTP data) on different port numbers, the source-destination load balancing algorithm may be used. The source destination algorithm can more easily handle recording in such an environment, as call streams from the same communication can be sent to different recorders and provide a roughly even distribution of calls for the recorders.

Figure 3:
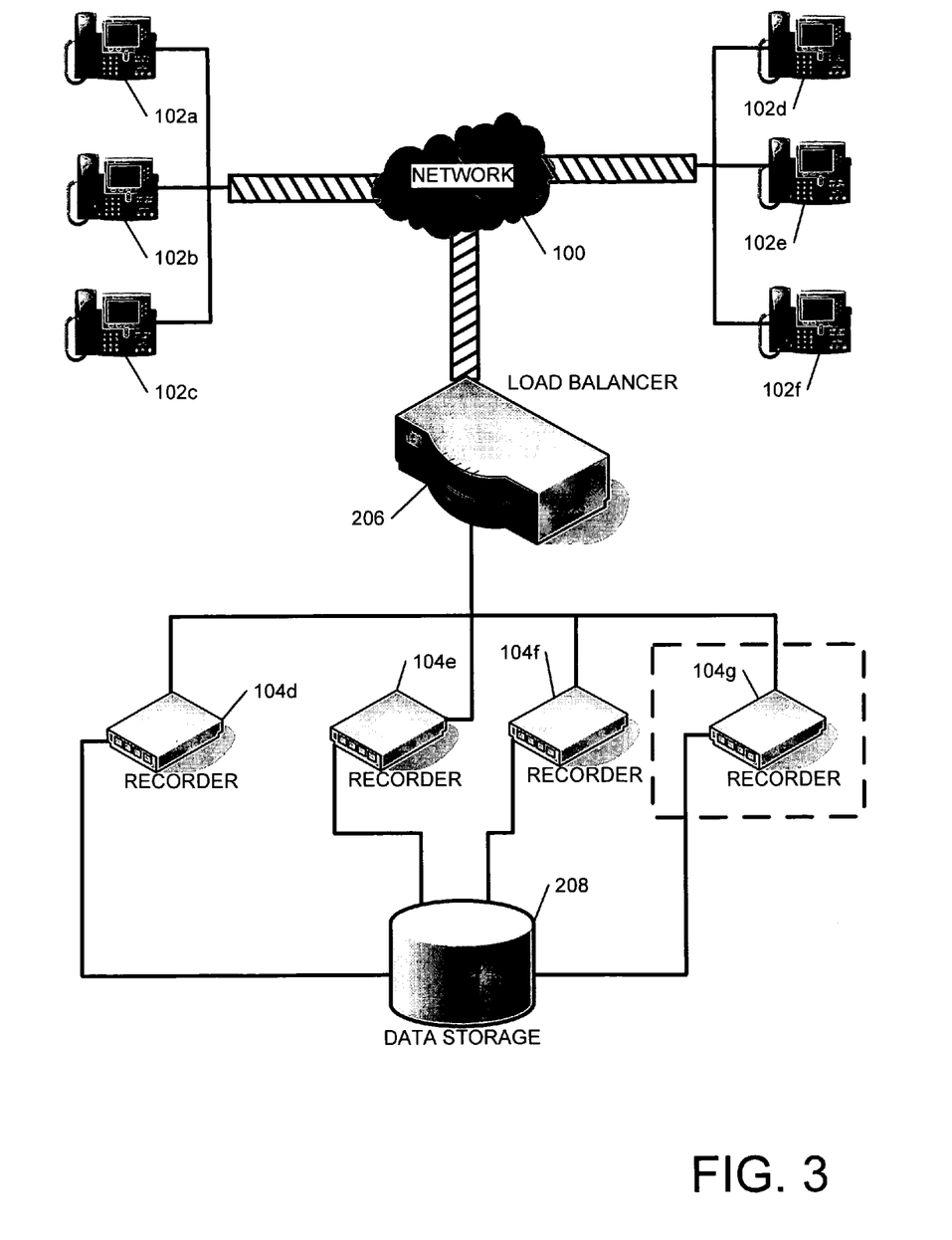
FIG. 3 is an exemplary network diagram illustrating use of a fail-over recorder in a network configuration, such as the configuration from FIG. 2.

FIG. 3 is an exemplary network diagram illustrating use of a fail-over recorder in a network configuration, such as the configuration from FIG. 2. More specifically, in addition to recorders 104d, 104e, and 104f, the network configuration of FIG. 3 also includes a fail-over recorder 104g. This recorder can be configured with the same functionality recorders 104d, 104e, and 104f, however, this recorder may be configured for use when one or more of the recorders 104d, 104e, and 104e malfunction (or otherwise are not being used). In such a scenario, the fail-over recorder 106g can automatically begin recording in response to detecting the malfunction occurs. Additionally, if the control data is being provided to all recorders (including fail-over recorder 106g), the transition to using the fail-over recorder 106g can be made with minimal data loss.

Additionally, while the fail-over recorder can be kept idle when there is no recorder malfunction, this is a nonlimiting example. More specifically, other embodiments can utilize at least a portion of the fail-over recorder's functionality when the fail-over recorder 106g is not otherwise in use. Additionally, while FIG. 3 illustrates the fail over recorder in N+1 fail-over protection (where N represents the total number of recorders, and 1 indicates the number of recorders available for fail-over), as one of ordinary skill in the art will understand, this disclosure can be interpreted to include N+M fail-over protection, where M can be any number of recorders available for fail-over. One should also note that with the above described fail-over protection employed, a network administrator may remove the malfunctioning recorder without affecting the remaining recorders 104, load balancer 206, and/or other network components.

Additionally, one should note that fail-over protection can be utilized in response to the load balancer 206 detecting a malfunction with a recorder (e.g., dead network cable). Other embodiments can include logic related to the recorder 104 for sending a signal to the load balancer 206 indicating that the recorder is to be taken out of service. Still other embodiments include logic related to the recorder 104 being configured to disable the connection with the load balancer 206 such that the load balancer 206 can detect that the link to that recorder 104 is dead.

Additional elements to the above described network configuration can include health checking logic (and/or watchdogs), where failure of one or more logic components (e.g., software) may be used to signal to the load balancer 206 to take that recorder out of service. Still other embodiments include using redundant recorders to smooth the load of data (e.g., receiving roughly equal amounts of data at each recorder) even when no recorder has failed. This can provide an increased use of available resources and ensure that all recorders are functional. In such a configuration, no one recorder is the "fail-over recorder," as any and/or all of the recorders can provide the desired fail-over protection. This can provide more redundant capacity into the network and provide greater performance since normal operational traffic is spread evenly across the available resources.

One should also note that in at least one embodiment call data can be preserved when a call is transferred from a first recorder to a second recorder. As a nonlimiting example, recorder 104f can be configured to record a communication between communications device 102a and communications device 102f. If a determination is made that it is more preferable that recorder 104g record the communication (e.g., recorder 104f fails, bandwidth issues with recorder 104f, etc.) the load balancer can be configured to send subsequently received data to recorder 104g. As one of ordinary skill in the art will understand, recorder 104f recorded a portion of the communication and recorder 104g recorded a portion of the communication. As such, the configuration of FIG. 3 can be configured to stitch together the two portions of the recorded communication such that, upon retrieval, the recorded data is viewed as a single recording. Additionally, depending on the particular configuration, this concept can be extended to any number of recorders.

Figure 4:
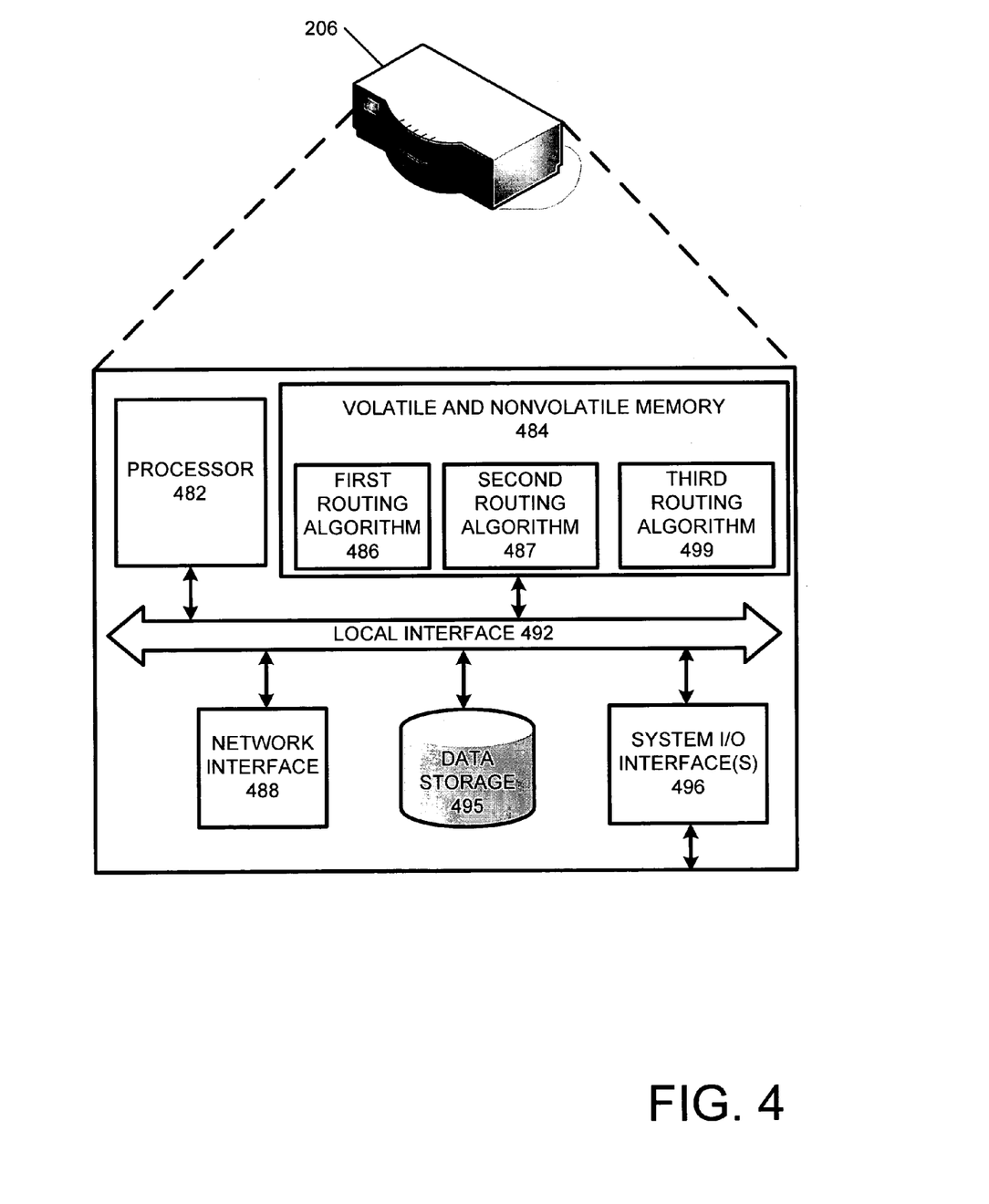
FIG. 4 is an exemplary block diagram illustrating various components in the load balancer from FIG. 2.

FIG. 4 is an exemplary block diagram illustrating various components in the load balancer from FIG. 2. Generally, in terms of hardware architecture, as shown in FIG. 4, the load balancer 206 includes a processor 482, volatile and nonvolatile memory 484, data storage 495, and one or more input and/or output (I/O) device interface(s) 496 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface 492 may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the load balancer 206, a semiconductor based microprocessor (in the form of a microchip or chip set), a macroprocessor, or generally any device for executing software instructions.

Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482. Additionally volatile and nonvolatile memory 484 can also include an first routing software 486, second routing software 487 and/or third routing software 499. Additionally, the volatile and nonvolatile memory can include an operating system (not shown), depending on the particular configuration.

A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System.

The Input/Output devices that may be coupled to system I/O Interface(s) 496 may include input devices, for example but not limited to, network interfaces, a keyboard, mouse, scanner, microphone, etc. Further, the Input/Output devices may also include output devices, for example but not limited to, network interfaces, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. Additionally, a display interface (not shown) may facilitate connection to a display monitor or other display device.

If the load balancer 206 includes a personal computer, workstation, or the like, the software in the volatile and nonvolatile memory 484 may further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the load balancer 206 is activated.

When the load balancer 206 is in operation, the processor 482 is configured to execute software stored within the volatile and nonvolatile memory 484, to communicate data to and from the volatile and nonvolatile memory 484, and to generally control operations of the load balancer 206 pursuant to the software. Software in memory, in whole or in part, are read by the processor 482, perhaps buffered within the processor 482, and then executed.

Additionally, as stated above, while reference in FIG. 4 is made to load balancer 206, similar architecture can apply to one or more of the components in the communications network. More specifically, depending on the particular configuration, a switch, recorder, communications device, etc. may include one or more of the components illustrated in FIG. 4. Further due to the differing functionality for these devices, a variance in the hardware and/or software components may be expected.

Figure 5:
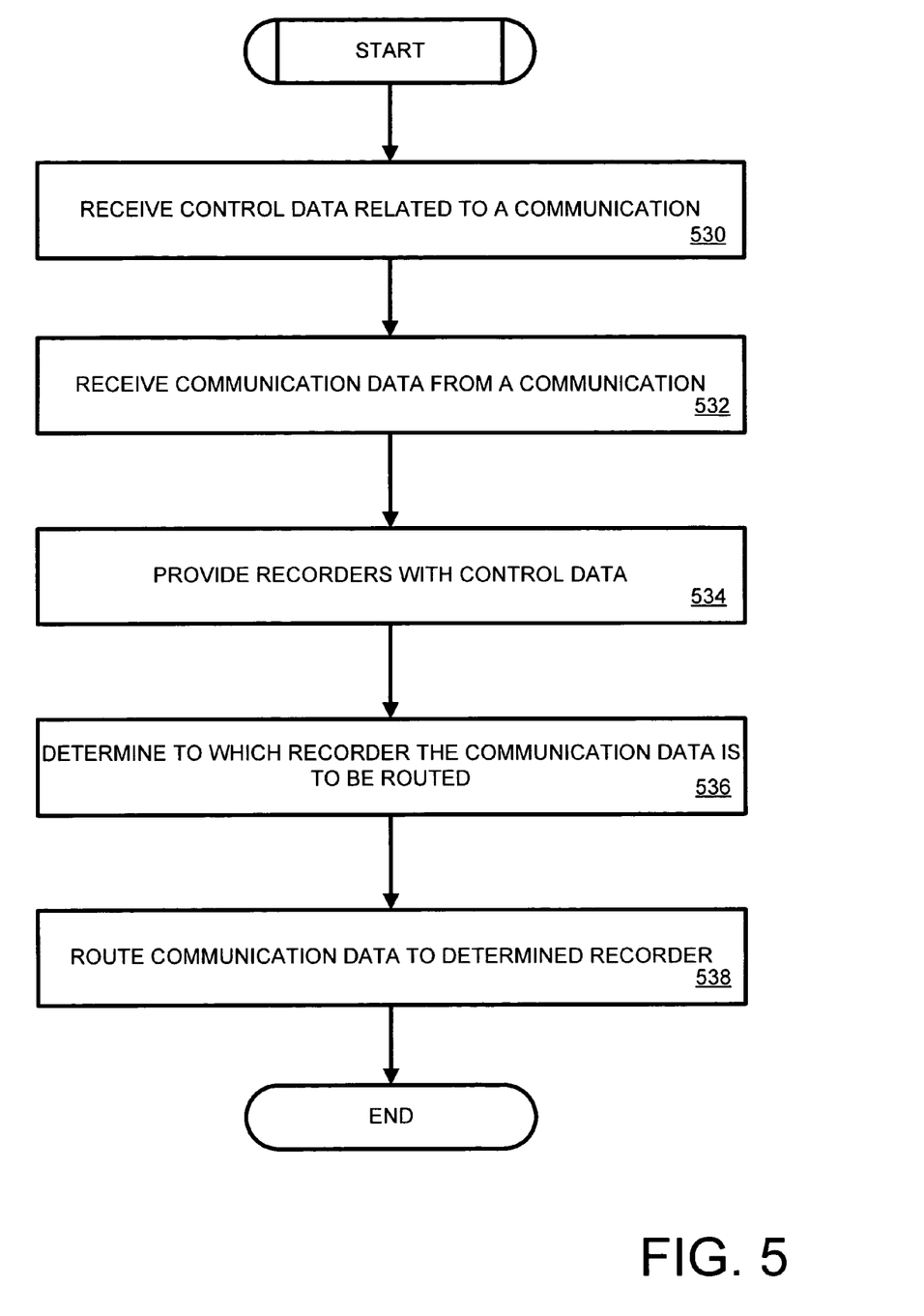
FIG. 5 is a flowchart illustrating exemplary steps for passively recording data from a communication in the network from FIG. 2.

FIG. 5 is a flowchart illustrating an embodiment of a method or exemplary steps for passively recording data from a communication in the network from FIG. 2. The first step in the nonlimiting example of FIG. 5 is to receive control data related to a communication (block 530). More specifically, referring back to FIG. 2, in at least one embodiment, when a user operating communications device 102*b* establishes a communication with a user on communications device 102*e*, communication data is sent between the two communications devices (and to load balancer 206). The communication data can include data related to voice, pictures, video, and/or other data for facilitating the communication. In addition to the communication data, control data may also be sent between the communication devices 102 (and load balancer 206). The control data can include data related to the dialed number, the IP address of the communications devices 102, the time of call, and/or other data.

The load balancer 206 can then receive communication data from a communication (block 532), as discussed above. Upon receiving the control data from any of a plurality of communications that may be taking place in the network, (as illustrated in block 530), the load balancer 206 can be configured to provide one or more of the recorders 104 with the control data. In at least one embodiment the load balancer 206 provides all recorders 104*d*, 104*e*, and 104*f* with the control data (block 534). The load balancer 206 can then determine to which recorder 104 the communication data is to be routed (block 536). As discussed above, depending on the particular embodiment, any of a plurality of routing algorithms can be used, including but not limited to the round robin algorithm, the weighted round robin algorithm, and the source-destination algorithm. Once the recorder is determined, the load balancer 206 can route the communication data to the determined recorder.

Figure 6:
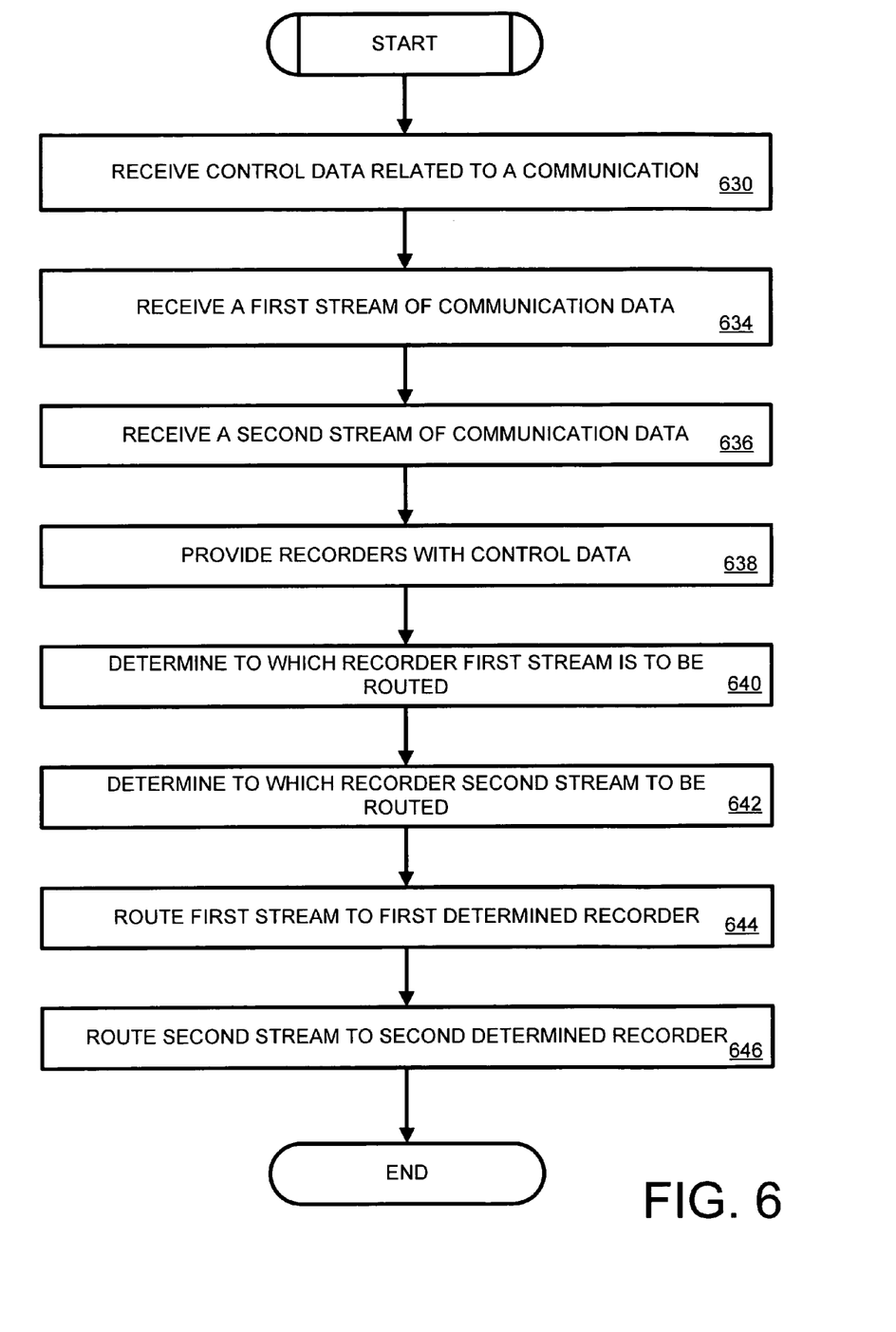
FIG. 6 is a flowchart illustrating exemplary steps for passively recording data in independent streams.

FIG. 6 is a flowchart illustrating exemplary steps for passively recording data in independent streams, similar to the flowchart from FIG. 5. The first step in the nonlimiting example of FIG. 6 is for the load balancer 206 to receive control data related to a communication (block 630). Next, the load balancer 206 can receive a first stream of communication data (block 634). The load balancer 206 can then receive a second stream of communication data (block 636). As discussed above, depending on the particular configuration, the communication can be received by the load balancer 206 via one stream, or by more than one stream. In this particular nonlimiting example, the communication data is received in a plurality of different streams.

The load balancer 206 can then provide the recorders with the received control data (block 638). The load balancer 206 can then determine to which recorder the first communication stream data is to be routed (block 640) and determine to which recorder the second communication stream is to be routed (block 642). The load balancer 206 can then route the first communication stream to the first determined recorder (block 644) and route the second communication stream to the second determined recorder (block 646).

Figure 7:
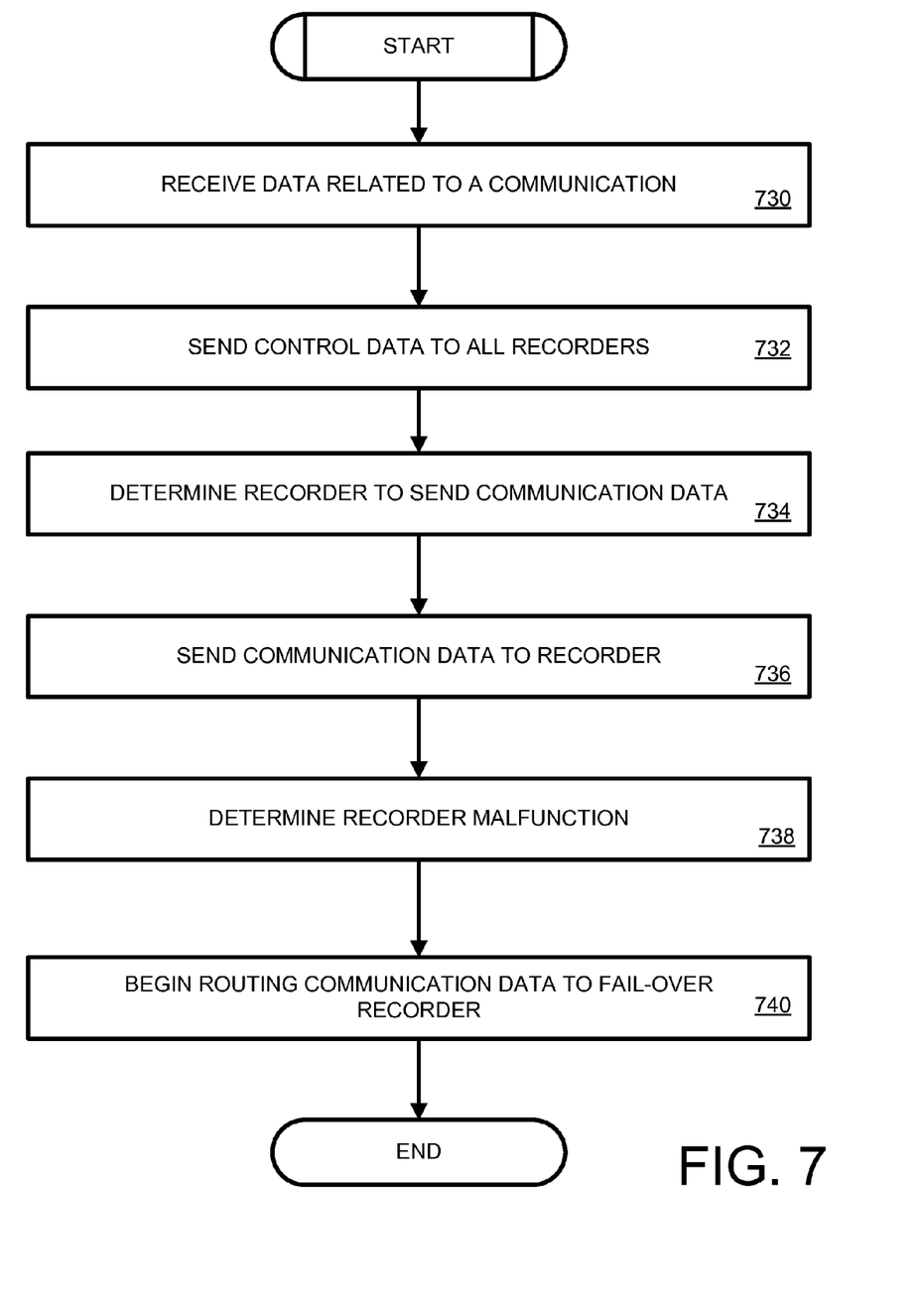
FIG. 7 is a flowchart illustrating exemplary steps for providing fail-over functionality in a network, such as the network from FIG. 3.

FIG. 7 is a flowchart illustrating exemplary steps for providing fail-over functionality in a network, such as the network from FIG. 3. The first step in the nonlimiting example of FIG. 7 is for the load balancer 206 to receive data related to a communication (block 730). As discussed above, the data can include control data, as well as communication data. Once the data is received, the load balancer can send the received control data to all recorders 104 coupled to the load balancer 206 (block 732). The load balancer 206 can then determine to which recorder to send the received communication data (block 734) and then send communication data to a recorder (block 736). The load balancer 206 can then detect a malfunction with the recorder (block 738). The load balancer 206 can make this determination in any of a plurality of ways including the load balancer 206 detecting a malfunction with a recorder (e.g., dead network cable). Other embodiments can provide that logic related to the recorder 104 sends a signal to the load balancer 206 indicating that the recorder is to be taken out of service. Still other embodiments provide that logic related to the recorder 104 disables the connection with the load balancer 206 such that the load balancer 206 can detect that the link to that recorder 104 is dead. Regardless of the technique for detecting the malfunction, the recorder can then begin routing the communication data to the fail-over recorder (block 740).

One should also note, that while the load balancer can be configured to detect errors in recorders, at least one embodiment can include a recorder with logic to self detect errors with the recorder. As a nonlimiting example, a recorder can be configured with logic for monitoring various hardware and/or software components using Intelligent Platform Management Interface (IPMI) and/or other protocol.

As one of ordinary skill in the art will understand, while the flowcharts discussed in this disclosure are illustrated as occurring in a particular order, this is a nonlimiting example. The steps in this disclosure can occur in any of a plurality of different orders, and may include more or fewer steps than illustrated herein. Additionally, while the steps in this disclosure relate to steps that are performed by load balancer 206, this is also a nonlimiting example. As one of ordinary skill in the art will understand, depending on the particular configuration, one or more of the steps can be performed by a different component.

One should note that the flowcharts included herein show the architecture, functionality, and/or operation of a possible implementation of logic. In this regard, each block can be interpreted to represent a hardware component, a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should also note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A load balancing component coupled to a communications network, the load balancing component comprising:
    a memory;
    a network interface; and
    a processor, wherein the processor executes:
        logic configured to route communication data to a plurality of recorders;
        logic configured to passively receive communication data related to a communication, wherein the communication data comprises a first stream and a second stream related to the same communication;
        logic configured to determine to which recorders of the plurality of recorders the received communication data is to be routed in accordance with the streams associated with the communication data and in order to achieve a balanced utilization of the plurality of recorders, the logic configured to determine to which recorders of the plurality of recorders the received communication data is to be routed includes a determination based on a past utilization of the plurality of recorders; and
        logic configured to route the communication data to the determined recorders in accordance with a weighting based on the past utilization, the weighting being related to an amount of utilization of each of the plurality of recorders, wherein the first stream is routed to a different recorder than the second stream.

2. The load balancing component of claim 1, further comprising logic configured to facilitate storage of the received communication data.

3. The load balancing component of claim 1, wherein the logic configured to determine to which recorders the received communication data is routed includes logic configured to determine current utilization of at least one of the plurality of recorders.

4. The load balancing component of claim 1, further comprising logic configured to receive control data related to the communication.

5. The load balancing component of claim 4, further comprising logic configured to send the received control data to the plurality of recorders.

6. The load balancing component of claim 1, wherein the communication includes a Voice over Internet Protocol (VoIP) communication.

7. The load balancing component of claim 1, wherein recorders with lesser amounts of utilization are assigned greater weights than recorders with greater amounts of utilization.

8. A method for routing communication data to a plurality of recorders, comprising:
   passively receiving communication data related to a communication, wherein the communication data comprises a first stream and a second stream related to the same communication;
   determining to which recorders of the plurality of recorders the received communication data is to be routed according to the streams associated with the communication data, a source-destination algorithm, and a determination based on a past utilization of the plurality of recorders; and
   routing the communication data to the determined recorders in accordance with a weighting based on the past utilization, the weighting being related to an amount of utilization of each of the plurality of recorders, wherein the first stream is routed to a different recorder than the second stream.

9. The method of claim 8, further comprising facilitating storage of the received communication data.

10. The method of claim 8, wherein determining to which recorders the received communication data is to be routed includes determining an amount of current utilization of at least one of the plurality of recorders.

11. The method of claim 8, further comprising receiving control data related to the communication.

12. The method of claim 8, wherein the communication includes a Voice over Internet Protocol (VoIP) communication.

13. A system for routing communication data to a plurality of recorders, comprising:
   a load balancing component coupled to the plurality of recorders, the load balancing component being passively coupled to a communication device, the load balancing component being configured to receive data related to a communication, wherein the received data comprises a first stream and a second stream related to the same communication, and determine recorders of the plurality of recorders for sending the received data in accordance with the streams associated with the received data and a determination based on a past utilization of the plurality of recorders, wherein at least one of the plurality of recorders is a fail-over recorder, and further wherein the first stream is sent to a different recorder than the second stream in accordance with a weighting based on the past utilization, the weighting being related to an amount of utilization of the plurality of recorders.

14. The system of claim 13, further comprising a data storage unit coupled to at least one of the plurality of recorders, the data storage unit being configured to receive data from at least one of the recorders.

15. The system of claim 13, wherein the load balancing component is further configured to facilitate fail-over protection.

16. The system of claim 13, further comprising means for recording at least a portion of the received data.

* * * * *